Dec. 29, 1959 J. G. LEWIS 2,918,815
ESTIMATING MOISTURE CONTENT OF TOBACCO
Filed Oct. 24, 1955
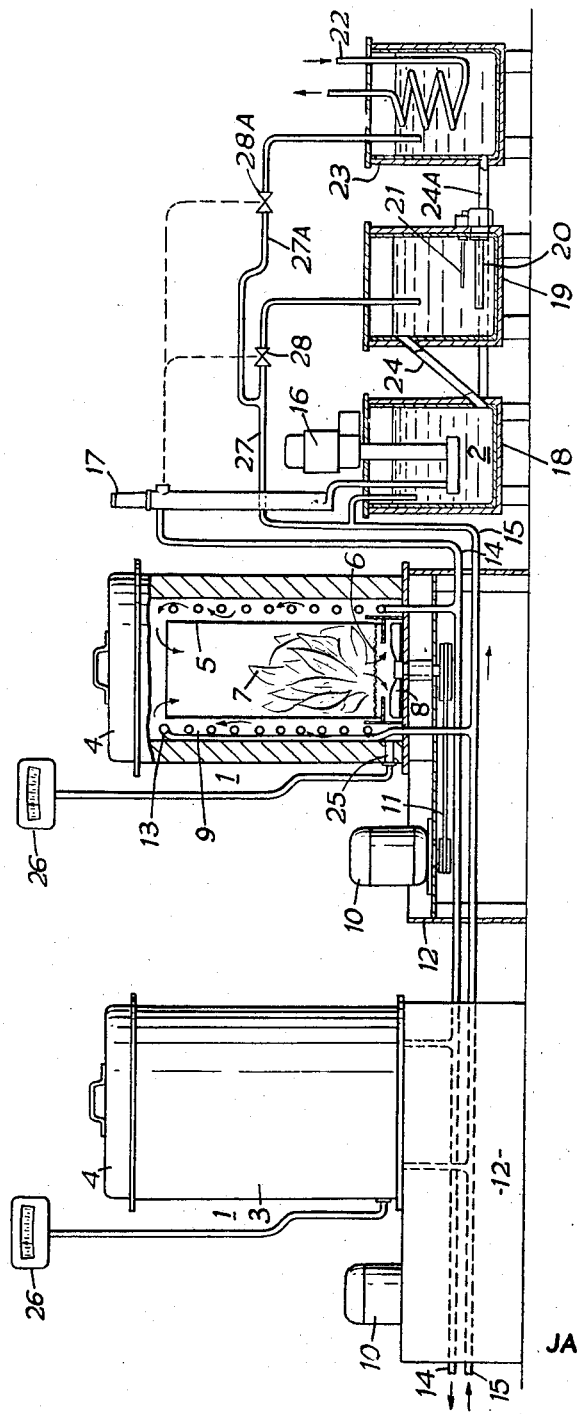
INVENTOR
JAMES G. LEWIS
BY
Wenderoth, Lind + Ponack
ATTORNEYS.

United States Patent Office 2,918,815
Patented Dec. 29, 1959

2,918,815
ESTIMATING MOISTURE CONTENT OF TOBACCO

James Gabriel Lewis, Bishopston, Bristol, England, assignor to The Imperial Tobacco Company Limited, Bristol, England, a British company Application October 24, 1955, Serial No. 542,383

3 Claims. (Cl. 73—73)

This invention relates to methods and apparatus for ascertaining the moisture content of tobacco on the basis of the relative humidity of air in contact therewith.

In estimating the moisture content of a material in the above manner, it is necessary to bring the material, its container and a humidity measuring instrument to the same temperature, or nearly so, if accuracy is to be obtained, and this may take a considerable time.

An installation for quickly and accurately estimating the moisture content of tobacco leaf samples is illustrated diagrammatically and by way of example in the accompanying drawing. The drawing shows two closable containers 1 connected to a common reservoir 2 containing water whose temperature may be controlled. Each container 1 comprises a lagged jacket 3 provided with a removable lid 4 and accommodating a vessel 5 with an imperforate wall and open at top and bottom. The vessel 5 contains a gridded or mesh floor 6 on which a sample of tobacco leaves 7 can rest, and beneath the floor 6 is a fan 8 adapted to circulate air through the vessel 5 and tobacco sample 7 therein and through an annular passageway 9 provided around the vessel 5. The fan 8 is rotated by an electric motor 10 through belt gearing 11, the container 1 and motor 10 being mounted on a common supporting structure 12.

Within the passageway 9 is accommodated a water coil 13, connected by flow and return pipelines 14, 15 respectively to the reservoir 2. Water at a controlled temperature is circulated through the pipelines 14, 15 and coils 13 in circuit therewith by an electrically-driven pump 16, the output of which is controlled by a liquid expansion thermostat 17, so that the circulating water is maintained at the controlled temperature desired. Preferably the water is maintained at a temperature approximating to the average temperature of the samples whose moisture content is to be measured, thereby economising in the time required to bring the apparatus and sample into moisture and temperature equilibrium.

The rate of change of temperature of the container 1 and its contents is also affected by the rate of air flow which in turn is regulated by fan speed. The water is maintained at the desired temperature in a lagged tank 18. Provision may be made for heating or cooling the water as found necessary, for example it may be heated in a lagged tank 19 by means of an immersion heater 20 provided with a controlling thermostat 21, or it may be cooled by running cold water through a coil 22 secured inside the tank 19 or, as shown, in a separate tank 23. The tank 19, and tank 23, if employed, is or are connected to the tank 18, housing the circulating pump, by transfer pipes 24, 24A.

The humidity of the circulating air is measured by an instrument 25 of any known and suitable form secured to the inside of the container 1, said instrument being connected to a dial 26.

The apparatus works in the following manner:

Suppose the average temperature of the samples to be measured is 90° F., then the water in the reservoir 2 and also of course in the coils 13 is maintained at that temperature.

A sample of the tobacco of which the moisture content is to be ascertained is placed on the grid 6. The lid 4 is then closed and the fan 8 is rotated. This acts to force the air up through the passageway 9 and down through the tobacco 7 as indicated by the arrows.

By this means the temperature of the apparatus (i.e. the interior of the container 1 and the instrument 26), the sample of tobacco and the circulating air are brought into equilibrium. Simultaneously the moisture content of the air and the sample of tobacco are also brought into equilibrium, whereupon the relative moisture content of the air is indicated on the dial 26.

The whole operation can be completed quickly (in from 5 to 10 minutes according to the degree of moisture) and due to all the parts being brought to the same temperature a very accurate reading is obtained.

On the return pipe 15 which leads to the circulating reservoir there is a branch pipe which leads to the hot tank 19 or the cold tank 23, whichever happens to be used. If there are both hot and cold tanks in use, then two branch pipes 27, 27A are required, as shown. The flow of water along the branch pipes 27, 27A is controlled by valves 28, 28A respectively, actuated by the accurate thermostat 17 mentioned above. If the temperature of the circulating system is falling, the thermostat 17 will operate the appropriate valve 28 to transfer a portion of the return water to the hot tank 19. This raises the level in that tank and causes some of the hot water to be transferred to the circulating tank 18. Conversely, if the temperature of the circulating system is rising, the thermostat will bring about the transfer of cold water from the cold tank 23 to the circulating tank 18 by opening the other valve 28A.

In some instances the equilibrating vessel may have to be installed in a part of a tobacco factory where it must always run at a temperature considerably above the ambient temperature. In this case it would be possible to dispense with the cold tank 23 because the natural tendency of the system to lose heat to the atmosphere provides all the cooling necessary. Conversely, there are instances where the vessel 1 has to be maintained at a lower temperature than the ambient temperature, and in this case the hot tank 19 is not needed.

As the sample of tobacco is not dried or, at any rate, not to any appreciable extent, it may be returned to the bulk supply for use. This is an advantage over known systems for ascertaining moisture content in which the tobacco is placed in an oven and dried, since such drying renders the tobacco unsuitable for use.

The process and apparatus of the present invention is equally applicable to cut or leaf tobacco.

Conditions sometimes arise in which the tobacco is cooler than that of the atmosphere, for example in a factory room the air may be, say, 65° F. while the tobacco due to its moisture content may be 60° F. In this case it is necessary to cool the water in the reservoir 2 by, for example, running tap water through the coil—to reduce its temperature to, say, 55° and then reheating it with the heater 20 to bring it up to the necessary 60° F.

I claim:

1. Installation for accurately estimating the moisture content of tobacco by the relative humidity method, comprising at least one treatment unit comprising a heat-insulated chamber having a heat exchanger coil spaced from its interior surface, a removable open-topped gridded-floor vessel for standing within said heat exchanger coil and constituting a container for sample tobacco leaves in its normal state, a fan axially aligned with said vessel for circulating air through said vessel to bring said air into moisture equilibrium with said sample, and an exteriorly accessible instrument for measuring relative humidity of the atmosphere within said chamber, a heat-insulated water storage tank connected by flow and return piping to the heat exchanger coil of said of least one treatment unit, and a heat-insulated tank having heating means therein for heating water under thermostatic control, said heating tank being connected to said storage tank and to the return piping connected to said coil.

2. Installation for accurately estimating the moisture content of tobacco by the relative humidity method, comprising at least one treatment unit comprising a heat-insulated chamber having a heat exchanger coil spaced from its interior surface, a removable open-topped gridded floor vessel for standing within said heat exchanger coil and constituting a container for sample tobacco leaves in its normal state, a fan axially aligned with said vessel for circulating air through said vessel to bring said air into moisture equilibrium with said sample, and an exteriorly accessible instrument for measuring relative humidity of the atmosphere within said chamber, a heat-insulated water storage tank connected by flow and return piping to the heat exchanger coil of said at least one treatment unit, and a heat-insulated tank having water cooling means therein, said cooling tank being connected to said storage tank and to the return piping connected to said coil.

3. Installation for accurately estimating the moisture content of tobacco by the relative humidity method, comprising at least one treatment unit comprising a heat-insulated chamber having a heat exchanger coil spaced from its interior surface, a removable open-topped gridded-floor vessel for standing within said heat exchanger coil and constituting a container for sample tobacco leaves in its normal state, a fan axially aligned with said vessel for circulating air through said vessel to bring said air into moisture equilibrium with said sample, and an exteriorly accessible instrument for measuring relative humidity of the atmosphere within said chamber, a heat-insulated water storage tank connected by flow and return piping to the heat exchanger coil of said at least one treatment unit, a heat-insulated tank having heating means therein for heating water under thermostatic control, and a heat-insulated tank having water cooling means therein, said water heating and water cooling tanks being selectively connectable to said storage tank and to the return piping connected to said coil.

References Cited in the file of this patent

UNITED STATES PATENTS

| 1,112,247 | Atkinson | Sept. 29, 1914 |
| 1,858,409 | Mittelsteiner | May 17, 1932 |
| 1,952,781 | Smith | Mar. 27, 1934 |
| 1,975,718 | Harris | Oct. 2, 1934 |
| 2,555,012 | Stofford | May 29, 1951 |
| 2,575,169 | Green | Nov. 13, 1951 |

FOREIGN PATENTS

| 897,760 | Germany | Nov. 23, 1953 |

OTHER REFERENCES

Dexter: A New Method for Moisture Testing in Dry Materials, Bakers Digest, October 1949.

UNITED STATES PATENT OFFICE

CERTIFICATE OF CORRECTION

Patent No. 2,918,815                        December 29, 1959

James Gabriel Lewis

It is hereby certified that error appears in the above numbered patent requiring correction and that the said Letters Patent should read as corrected below.

In the grant, lines 2 and 12, and in the heading to the printed specification, line 5, name of assignee, for "The Imperial Tobacco Company Limited", each occurrence, read -- The Imperial Tobacco Company (of Great Britain and Ireland) Limited --.

Signed and sealed this 12th day of July 1960.

(SEAL)
Attest:

KARL H. AXLINE
Attesting Officer

ROBERT C. WATSON
Commissioner of Patents